(12) United States Patent
Denney

(10) Patent No.: US 9,834,125 B2
(45) Date of Patent: Dec. 5, 2017

(54) TELESCOPING POLE RACK

(71) Applicant: Altec Industries, Inc., Birmingham, AL (US)

(72) Inventor: Eric M. Denney, St. Joseph, MO (US)

(73) Assignee: Altec Industries, Inc., Birmingham, AL (US)

(*) Notice: Subject to any disclaimer, the term of this patent is extended or adjusted under 35 U.S.C. 154(b) by 0 days.

(21) Appl. No.: 14/977,792

(22) Filed: Dec. 22, 2015

(65) Prior Publication Data

US 2017/0174111 A1    Jun. 22, 2017

(51) Int. Cl.
*B60P 3/00* (2006.01)
*B60P 1/02* (2006.01)
*B60P 3/40* (2006.01)

(52) U.S. Cl.
CPC .. *B60P 1/02* (2013.01); *B60P 3/40* (2013.01)

(58) Field of Classification Search
CPC ............. Y02E 10/728; Y10T 29/49826; F05B 2240/913; F16M 13/027; H01F 7/04; B25G 1/04; A61M 5/1415; A63C 11/221; H02S 20/32; A45B 2009/007
USPC .......................................................... 296/3
See application file for complete search history.

(56) References Cited

U.S. PATENT DOCUMENTS

| | | | | |
|---|---|---|---|---|
| 4,328,989 A | * | 5/1982 | Childers | B60P 3/32 220/521 |
| 4,951,991 A | * | 8/1990 | Haigler | B62D 33/08 296/26.09 |
| 4,966,402 A | * | 10/1990 | Robertson | B66F 11/044 212/294 |
| 4,989,768 A | * | 2/1991 | McNulty | B60R 9/02 224/405 |
| 5,022,696 A | * | 6/1991 | Moller | B62D 33/03 296/36 |
| 5,037,152 A | * | 8/1991 | Hendricks | B60R 9/00 296/26.06 |
| 5,078,309 A | * | 1/1992 | Hull | B60R 7/14 211/64 |
| 5,152,570 A | * | 10/1992 | Hood | B60R 9/00 296/3 |
| 5,255,951 A | * | 10/1993 | Moore, III | B60R 9/02 224/405 |
| 5,439,152 A | * | 8/1995 | Campbell | B60R 9/00 108/55.1 |
| 5,544,978 A | * | 8/1996 | Albers | E02D 7/26 173/184 |

(Continued)

*Primary Examiner* — Kiran B Patel
(74) *Attorney, Agent, or Firm* — Erise IP, P.A.

(57) ABSTRACT

A telescoping pole rack is used with a utility vehicle for supporting a utility pole or other load. The telescoping pole rack comprises a base, a lower telescope segment, an upper telescope segment, an actuator, and a pole rest. The base configured to be secured to the utility vehicle. The lower telescope segment is secured to the base and oriented in a substantially upward direction. The upper telescope segment is configured to nest with the lower telescope segment. The actuator is associated with the lower telescope segment and the upper telescope segment to selectively elongate the telescoping pole rack. The pole rest disposed atop the upper telescope segment configured to support at least a portion of a pole thereon. The telescoping pole rack is used with a static pole rack to support utility poles at a certain traveling angle relative to the ground.

13 Claims, 7 Drawing Sheets

(56) References Cited

U.S. PATENT DOCUMENTS

| | | | | |
|---|---|---|---|---|
| 5,560,666 A * | 10/1996 | Vieira | B60R 9/00 224/402 |
| 5,569,167 A * | 10/1996 | Friedli | A61H 3/00 482/51 |
| 5,660,637 A * | 8/1997 | Dodge | B05B 13/0285 118/500 |
| 5,662,254 A * | 9/1997 | Lemajeur | B60P 3/40 224/405 |
| 5,678,743 A * | 10/1997 | Johnson | B60P 3/40 224/405 |
| 5,752,799 A * | 5/1998 | Carey | B60P 1/5471 224/403 |
| 5,938,092 A * | 8/1999 | Johnson | B60R 9/06 224/405 |
| 5,950,890 A * | 9/1999 | Darby | B60R 9/06 224/402 |
| 6,299,336 B1 * | 10/2001 | Hulse | B60Q 1/2611 362/198 |
| 6,698,810 B1 * | 3/2004 | Lane | B60P 3/40 296/26.02 |
| 7,104,429 B1 * | 9/2006 | Flores | B60R 9/00 211/207 |
| 7,243,966 B1 * | 7/2007 | Sheldon | B60P 3/40 224/519 |
| 7,299,589 B2 * | 11/2007 | Campbell | H01Q 1/10 193/35 R |
| 7,581,917 B1 * | 9/2009 | Depagter | B60P 3/40 224/321 |
| 7,631,916 B1 * | 12/2009 | Coleman | B60P 3/40 296/3 |
| 7,635,248 B2 * | 12/2009 | Nolan | B60P 1/02 187/234 |
| 7,798,752 B2 * | 9/2010 | Harrison | B60P 3/40 296/51 |
| 7,976,089 B2 * | 7/2011 | Jones | B60P 3/40 224/405 |
| 8,317,226 B1 * | 11/2012 | Wong | G09F 17/00 280/769 |
| 8,430,286 B1 * | 4/2013 | Patrick | B60R 9/00 224/310 |
| 8,454,399 B1 * | 6/2013 | Zelechonok | B60F 3/0038 440/12.51 |
| 8,506,142 B2 * | 8/2013 | Macke | B60Q 1/0491 362/382 |
| 8,608,219 B1 * | 12/2013 | Platto | B62D 33/0273 296/26.05 |
| 8,678,457 B1 * | 3/2014 | Duderstadt | B60R 3/00 16/429 |
| 8,820,811 B1 * | 9/2014 | Hemphill | B60R 9/00 248/222.52 |
| 8,915,529 B1 * | 12/2014 | Bond | B25G 1/04 294/209 |
| 8,985,933 B2 * | 3/2015 | Ziaylek | B60R 9/0423 182/127 |
| 9,216,698 B2 * | 12/2015 | Rhodes | B60R 9/065 |
| 9,278,246 B2 * | 3/2016 | Tambornino | A63B 21/078 |
| 9,487,152 B2 * | 11/2016 | Scott | B60R 9/045 |
| 9,493,123 B2 * | 11/2016 | Martin | B60R 9/00 |
| 9,586,629 B2 * | 3/2017 | Leitner | B62D 33/0207 |
| 2002/0190534 A1 * | 12/2002 | Armstrong | B60P 3/40 296/3 |
| 2003/0057244 A1 * | 3/2003 | Dorety | B60R 9/06 224/519 |
| 2009/0189403 A1 * | 7/2009 | Voglmayr | B60P 1/02 296/3 |
| 2010/0072237 A1 * | 3/2010 | Green | B60R 9/00 224/405 |
| 2010/0183412 A1 * | 7/2010 | Borntrager | B66F 9/065 414/541 |
| 2011/0127790 A1 * | 6/2011 | Mokhtari | B60P 3/42 296/3 |
| 2013/0229025 A1 * | 9/2013 | Johnasen | B60P 3/00 296/3 |
| 2014/0197653 A1 * | 7/2014 | Stepanians | B60P 3/40 296/3 |

* cited by examiner

TELESCOPING POLE RACK

BACKGROUND

1. Field

Embodiments of the invention relate to digger derricks and other utility vehicles. More particularly, embodiments of the invention relate to pole racks for supporting utility poles during transportation to and from a work site.

2. Related Art

A utility pole is a column or post used to support lines providing various public utilities, such as electric power, Internet and television cable, phone cable, and fiber optic cable. Utility poles also provide support for other equipment, such as street lights, traffic lights, cellular network antennas, transformers, capacitors, reclosers, and fuses. Utility poles are typically constructed from various species of wood but can also be constructed from aluminum, steel, concrete, and composites such as fiberglass. Some utility poles, especially dead-end or termination poles, are supported by guy-wires. Utility poles may also be tagged, branded, or otherwise marked to identify critical information. Other names for utility poles include transmission pole, telephone pole, telecommunication pole, telegraph pole, and telegraph post.

Construction and utility equipment may be equipped to lift, move, and place heavy loads, such as utility poles. Such equipment may include a boom and a winch for engaging and moving heavy loads. By way of example, digger derricks and similar utility vehicles are used to set utility poles and the like by digging or drilling holes and then placing the utility poles into the holes. Digger derricks may include an auger to dig the hole, a winch to lift the pole, and a pole guide mounted on a boom to stabilize and guide the placement of the pole as the pole is positioned and then placed in the hole using the boom and winch.

During transportation to and from a worksite, the utility poles create a substantial hazard to surrounding vehicles and structures. Utility poles are typically longer than the utility vehicles that carry them. Therefore, carrying the utility pole at a certain traveling angle relative to the ground is desirable so as to reduce the longitudinal length of the pole that is disposed in front of and behind the utility vehicle.

SUMMARY

Embodiments of the invention solve the above-mentioned problems by providing a telescoping pole rack for use with a utility vehicle. The telescoping pole rack is selectively elongated or shortened by an operator so as to easily and quickly set a desired traveling angle. Because the desired traveling angle may not be readily apparent until the utility pole is on the utility vehicle, the telescoping pole rack is configured to adjust the traveling angle with one or more utility poles stored thereon.

A first embodiment of the invention is generally directed to a telescoping pole rack that is configured to be used with a utility vehicle for supporting a utility pole or other load. The telescoping pole rack comprises a base, a lower telescope segment, an upper telescope segment, an actuator, and a pole rest. The base configured to be secured to the utility vehicle. The lower telescope segment is secured to the base and oriented in a substantially upward direction. The upper telescope segment is configured to nest with the lower telescope segment. The actuator is associated with the lower telescope segment and the upper telescope segment to selectively elongate the telescoping pole rack. The pole rest disposed atop the upper telescope segment configured to support at least a portion of a pole thereon.

A second embodiment of the invention is generally directed to a utility vehicle configured to support at least one utility pole thereon for transportation. The utility vehicle comprises a chassis, a cab, and a first pole rack assembly. The cab is secured to the chassis. The first pole rack assembly is configured to support a first utility pole thereon. The first pole rack assembly including a first static pole rack presenting a first height, and a first telescoping pole rack presenting an adaptable second height. The first pole rack is configured to support the first utility poles at a first traveling angle, determined by a difference the first height of the static pole rack and second height of the telescoping pole rack. In some embodiments, the utility vehicle comprises a second pole rack assembly configured to support a second pole thereon. The second pole rack assembly includes a second static pole rack presenting said first height, and a second telescoping pole rack presenting an adaptable third height.

A third embodiment of the invention is generally directed to a method of transporting a utility pole. The method comprises the steps of placing the utility pole on a pole rack assembly, wherein the pole rack assembly includes a static pole rack and a telescoping pole rack; and engaging an actuator to adjust a height presented by the telescoping pole rack while the utility pole is disposed on the pole rack assembly, wherein the height is determinative of a traveling angle for the utility pole, said traveling angle being a measurement of an angle of the pole relative to a horizontal plane, wherein the height is adjusted so as to set a desired traveling angle.

Additional embodiments of the invention are directed to a dual telescoping pole rack assembly configured to be added to an existing utility vehicle, a method of installing the dual pole rack assembly onto the utility vehicle, a method of installing a utility pole, a method of adjusting a traveling angle, etc.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

Figure 1:
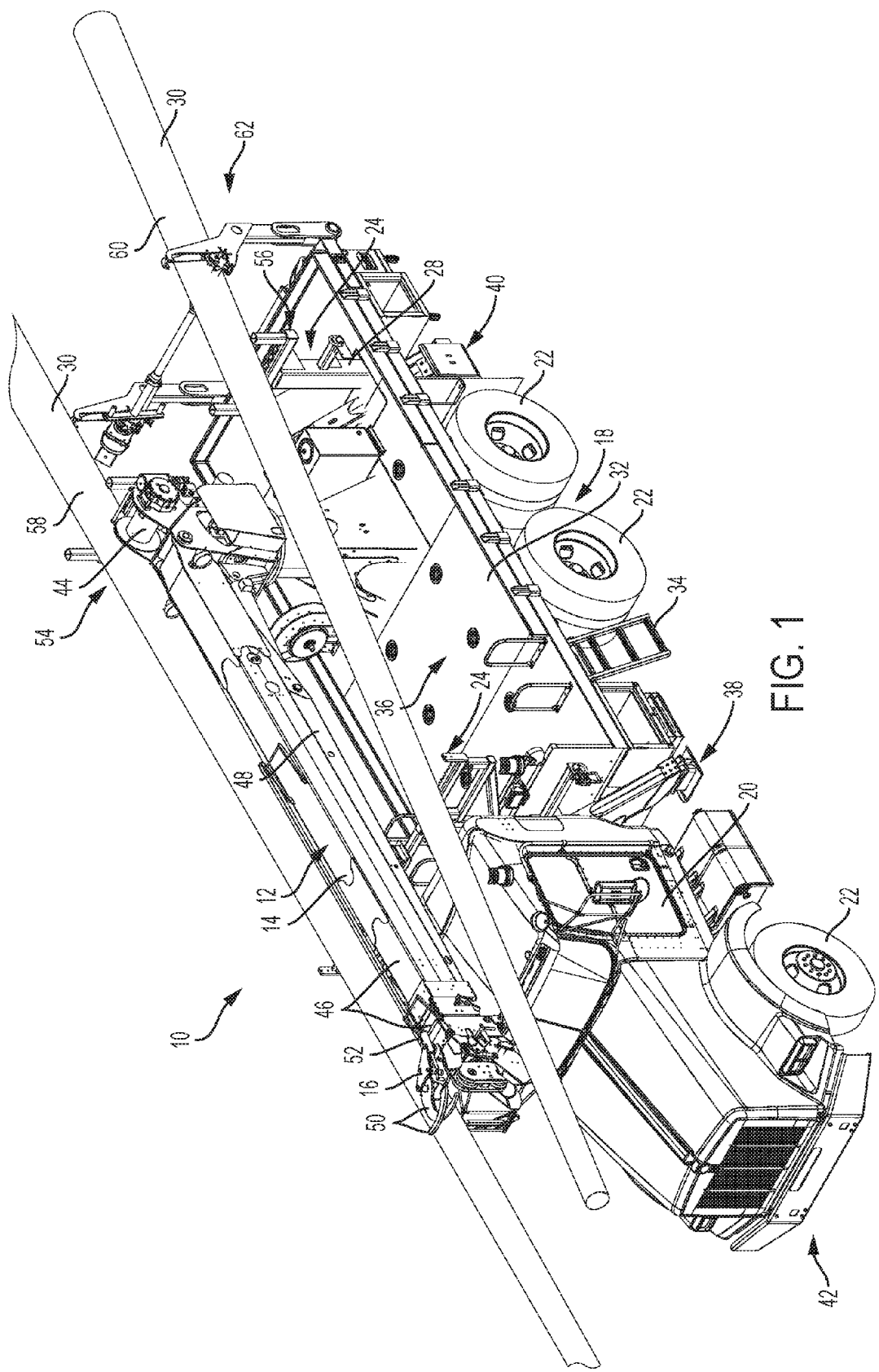
FIG. 1 is an environmental view illustrating an exemplary utility vehicle that includes a telescoping pole rack with two utility poles stored thereon at different traveling angles.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the invention can include a variety of combinations and/or integrations of the embodiments described herein.

Turning now to the drawings, an exemplary utility vehicle 10 with a boom assembly 12 including a boom 14 and a pole guide 16, a chassis 18, a cab 20, a plurality of wheels 22, and a pole rack assembly 24 including a static pole rack 26 and a telescoping pole rack 28 is illustrated in FIG. 1. The boom assembly 12 is configured to rotate about and pivot relative to the chassis 18. The chassis 18 supports the boom assembly 12 as well as the other components. The cab 20 is configured to support the operator therein during mobile operations, static operations, or both. The telescoping pole rack 28 is secured to the chassis 18 to support a utility pole 30 before, during, and after mobile operations. The cab may include the static pole rack 26 secured thereto for supporting the utility pole 30, such that the utility pole 30 rests over the cab in part.

An exemplary use for the invention is in the field of utility pole 30 replacement and repair. The utility vehicle 10 is configured to assist an operator in placing, removing, and repairing utility poles 30. The utility vehicle 10 loads or otherwise receives at least one utility pole 30 on the static pole rack 26 and telescoping pole rack 28 from a utility pole repository. The operator then sets the telescoping pole rack 28 to a desired height. The operator then drives the utility vehicle 10 to the work site. The operator then prepares the worksite to receive the utility pole 30. For example, the operator may dig a new hole using an auger of the boom assembly 12. As another example, the operator may remove a worn or damaged utility pole 30 using the pole guide 16 and/or winch of the boom assembly 12. The operator then picks up the new utility pole 30 from the telescoping pole rack 28 using the pole guide 16 and/or winch. After lifting the new utility pole 30 from the telescoping pole rack 28, the operator will place the new utility pole 30 in the hole. The operator will then align and secure the new utility pole 30 into the correct position. If applicable, the operator may then use the pole guide 16 and/or winch to place the worn or damaged utility pole 30 onto the telescoping pole rack 28. The operator may then return to the utility pole 30 repository to retrieve additional utility poles 30 or perform other tasks as required.

It should be appreciated that the above is only an exemplary field of use for the invention. Other fields of use could include the transportation and support of construction materials for buildings and bridges, pipe materials for underground fluid passages, etc. The telescoping pole rack 28 of the invention assist in the transportation of large and long items. The telescoping pole rack 28 is therefore applicable and useful in any of numerous fields of use.

Figure 2:
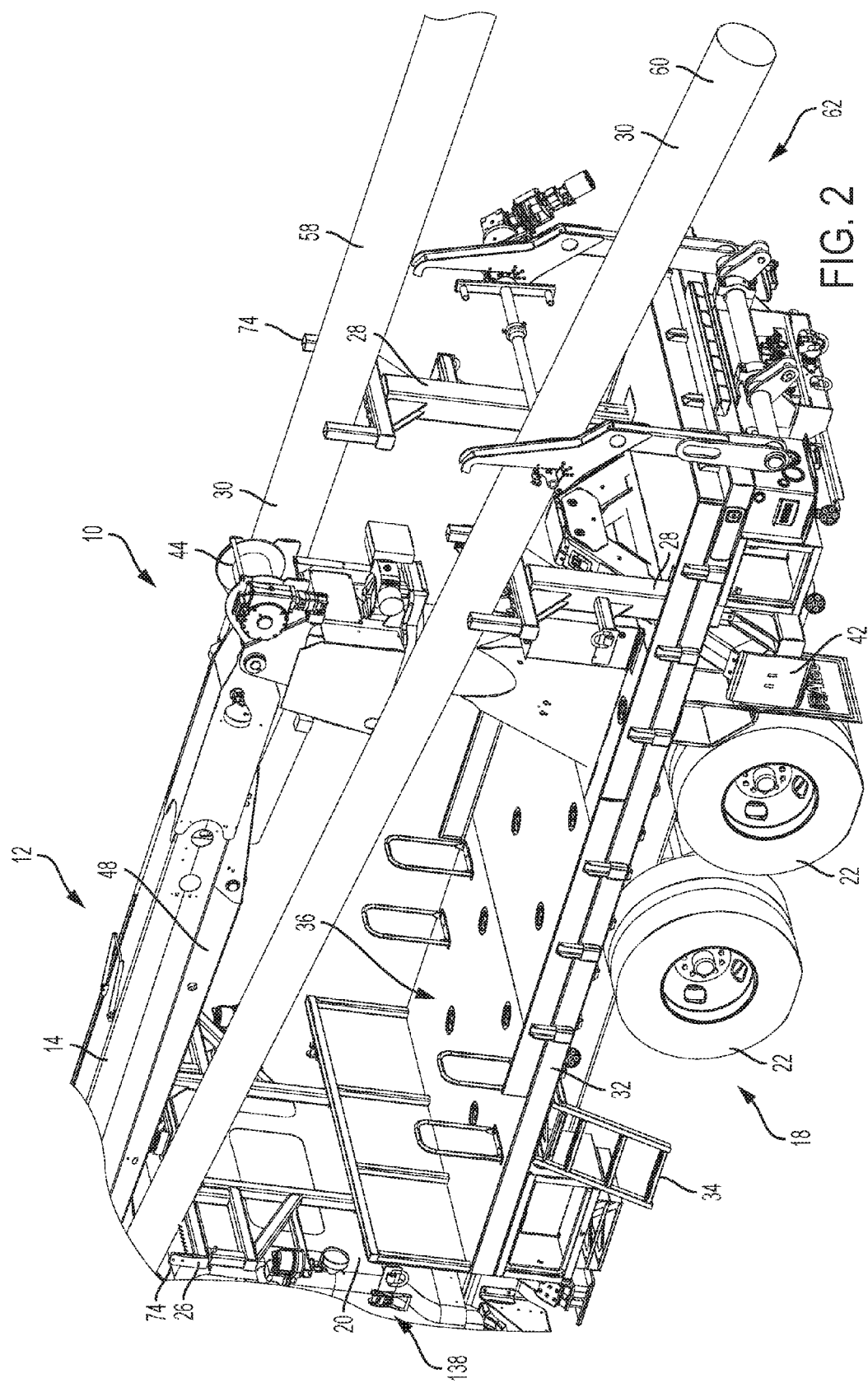
FIG. 2 is a perspective view of the utility vehicle from a left side, specifically illustrating the pole rack.

The various components of the utility vehicle 10 will now be discussed. The chassis 18 of the utility vehicle 10 provides structural support for the utility vehicle 10. The chassis 18 may present a deck 32 upon which an operator can stand. The deck 32 may include a ladder 34 or other structure to assist the operator in climbing onto a top working surface 36 of the deck 32, as best illustrated in FIG. 2. The chassis 18 provides structural support for the cab 20 and the wheels 22. The chassis 18 may also include a forward outrigger system 38 and a rear outrigger system 40 for supporting and stabilizing the chassis 18 while the boom assembly 12 is being utilized.

The cab 20 is disposed toward an anterior end 42 of the utility vehicle 10. The cab 20 presents a cavity in which the operator can sit to drive the vehicle and/or operate the boom assembly 12. The wheels 22 are rotatably secured to the chassis 18 and powered by an engine so as to provide for mobile operations of the utility vehicle 10.

The boom assembly 12 is mounted on the chassis 18 of the utility vehicle 10 to enable rotational and/or pivotal movement relative to the chassis 18 of the utility vehicle 10. The boom assembly 12 includes a winch 44 with an associated load line for attaching to and lifting a load in a conventional manner. The illustrated boom 14 comprises a plurality of nested boom sections 46 that may be telescopically extended and retracted. However, in other embodiments of the invention, the boom 14 may comprise a single, non-telescoping section or may include a pivoting boom section 48 that pivot relative to the other sections. The vehicle may further include additional implements or tools not depicted in the drawings, such as an auger attached to the boom 14 for drilling a hole for utility pole placement.

The pole guide 16 is secured to a distal end of the boom 14 and is positioned to engage, secure, and stabilize a load held by the load line and guide the load into a desired position. In other embodiments of the invention, the pole does not utilize a load line, for example, if the load is relatively lightweight. By way of example, the load may be the utility pole 30, wherein the pole guide 16 engages and stabilizes the utility pole 30 while the boom 14 lifts and positions the pole to be placed in a hole. By way of another example, the load could be a fence post. By way of yet another example, the load could be a beam for the construction of a structure, a pipe section for the construction of a pipe. The load could also be any other object that has a section thereof which could be gripped by the pole guide 16 and stored on the pole racks.

To operate the pole guide 16, an operator rotates the pole guide tongs 50 to an open position by moving a distal end of one of the pole guide tongs 50 away from the other pole guide tong 50. This can be accomplished manually, mechanically, hydraulically, pneumatically, electrically, or a combination thereof. With the pole guide tongs 50 in the open position, the operator moves the boom 14 vertically and horizontally as necessary and extends or retracts the boom 14. This operation is performed until the load is located against a pole guide base 52, or close thereto, and between the pole guide tongs 50, or close thereto. The operator then ceases or slows movement of the boom 14. The operator then moves the pole guide tongs 50 to the closed position by rotating their distal ends toward one another, such that the pole guide tongs 50 come in contact with both sides of the load. Again, this can be done manually, mechanically, hydraulically, pneumatically, electrically, or a combination thereof. A pressure is then continuously, or nearly continuously, applied to the load by the pole guide tongs 50, such that the load is held securely by the pole guide tongs 50 and pole guide base 52. The operator then moves the boom 14, and by extension moves the load, into a desired position, orientation, or location (such as onto the pole rack assembly 24).

As used herein, "operator" refers to a person operating the utility vehicle 10 or assisting therewith, a person performing maintenance on the utility vehicle 10, a supervisor overseeing the operation of the utility vehicle 10, or other person consistent with the context.

The pole rack assemblies are configured to support and secure the utility pole 30 or other load during transportation. In embodiments of the invention, such as illustrated in FIGS. 1 and 2, the utility vehicle 10 comprises a right-side pole rack assembly 54 and a left-side pole rack assembly 56. Each pole rack assembly 24 is configured to support at least one pole thereon. For example, the right-side pole rack assembly 54 is configured to support a first pole 58 thereon, and the left-side pole rack assembly 56 is configured to support a second pole 60 thereon. The utility vehicle 10 is therefore configured to carry two utility poles 30 simultaneously, one in the left-side pole rack assembly 56 and one in the right-side pole rack assembly 54. Depending on the relative sizes of the utility poles 30 and the pole rack assemblies, a plurality of utility poles 30 may be disposed on each pole rack assembly 24. The plurality of utility poles 30 could be arranged horizontally adjacent, vertically adjacent, or a combination thereof.

Each pole rack assembly 24 includes the static pole rack 26 and the telescoping pole rack 28. In embodiments of the invention, the static pole rack 26 is disposed toward the anterior end 42 of the utility vehicle 10 and the telescoping pole rack 28 is disposed toward a posterior end 62 of the utility vehicle 10, as illustrated in FIG. 2. In embodiments of the invention, the static pole rack 26 presents a forward height and the telescoping pole rack 28 presents an adjustable rear height. As discussed above, the difference in height between the forward height of the static pole rack 26 and the rear height of the telescoping pole rack 28 defines a traveling angle. The traveling angle is a measure of the angle of a straight pole rack disposed on the pole rack assembly 24 as compared to a horizontal plane.

The pole rack assembly 24 is configured to receive the utility pole 30 such that a center of gravity of the utility pole 30 is disposed between the static pole rack 26 and the telescoping pole rack 28. The static pole rack 26 and the telescoping pole rack 28 are spaced longitudinally away from each other. It should be appreciated that while the static pole rack 26 and the telescoping pole rack 28 are referred to collectively as the "pole rack assembly," in embodiments of the invention, the static pole rack 26 and the telescoping pole rack 28 are two separate and distinct structures that are associated by their use in supporting a common utility pole 30. By spacing the static pole rack 26 and the telescoping pole rack 28 away from each other, the stability of the utility pole 30 stored thereon is increased. Typically, the operator will place the utility pole 30 such that the center of gravity of the utility pole 30 is approximately centered between the static pole rack 26 and the telescoping pole rack 28 so as to maximize stability. The utility pole 30 may also be secured to the pole rack assembly 24 as discussed below.

In other embodiments, not illustrated, the pole rack assembly 24 comprises the static pole rack 26, the telescoping pole rack 28, and an intermediary telescoping pole rack (not illustrated). The intermediary telescoping pole rack is disposed between the static pole rack 26 and the telescoping pole rack 28. The intermediary telescoping pole rack provides a third support point (in addition to the static pole rack 26 and the telescoping pole rack 28). The intermediary telescoping pole rack may telescope up and down in tandem with the telescoping pole rack 28, such that the pole rack assembly 24 remains aligned.

In still other embodiments, not illustrated, the static pole rack 26 is disposed toward the posterior end 62 of the utility vehicle 10 and the telescoping pole rack 28 is disposed toward the anterior end 42 of the utility vehicle 10. In yet further embodiments, not illustrated, the pole rack assembly 24 includes a first telescoping pole rack and a second telescoping pole rack (without the static pole rack 26). This allows even greater customization of the traveling angle. For example, the cab 20 may be disposed toward a left anterior side of the chassis 18 and the pole rack assembly 24 may be disposed on a right side. The pole rack assembly 24 could therefore set a traveling angle in which either the front end or the back end of the utility pole 30 is tipped downward.

The telescoping pole rack 28 will now be discussed in greater detail. The telescoping pole rack 28 generally includes a base 64, a lower telescope segment 66, an upper telescope segment 68, an actuator 70 such as a hydraulic cylinder 72, and a pole rest 74. The base 64 is secured to the chassis 18 of the utility vehicle 10. The lower telescope segment 66 is secured at a proximal end 76 to the base 64 and a distal end 78 is oriented generally upward. The upper telescope segment 68 is nested with the lower telescope segment 66 at a proximal end 80. The actuator 70 is associated with the upper telescope segment 68 so as to selectively elongate and shorten the height presented by the telescoping pole rack 28. The pole rest 74 is disposed at a distal end 82 of the upper telescope segment 68. In some embodiments, the pole rest 74 includes a plurality of upward-facing protrusions 84 to frictionally hold the utility pole 30 in the pole rest 74.

The base 64 of the telescoping pole rack 28 provides structural support for the telescoping pole rack 28 and secures the telescoping pole rack 28 to the chassis 18 of the utility vehicle 10. As can be seen in FIG. 1, in embodiments of the invention, the base 64 supports a left-side telescoping pole rack 86 and a right-side telescoping pole rack 88. The left-side telescoping pole rack 86, the right-side telescoping pole rack 88, and the common base 64 may be referred to collectively as a dual telescoping pole rack assembly 90.

Figure 4:
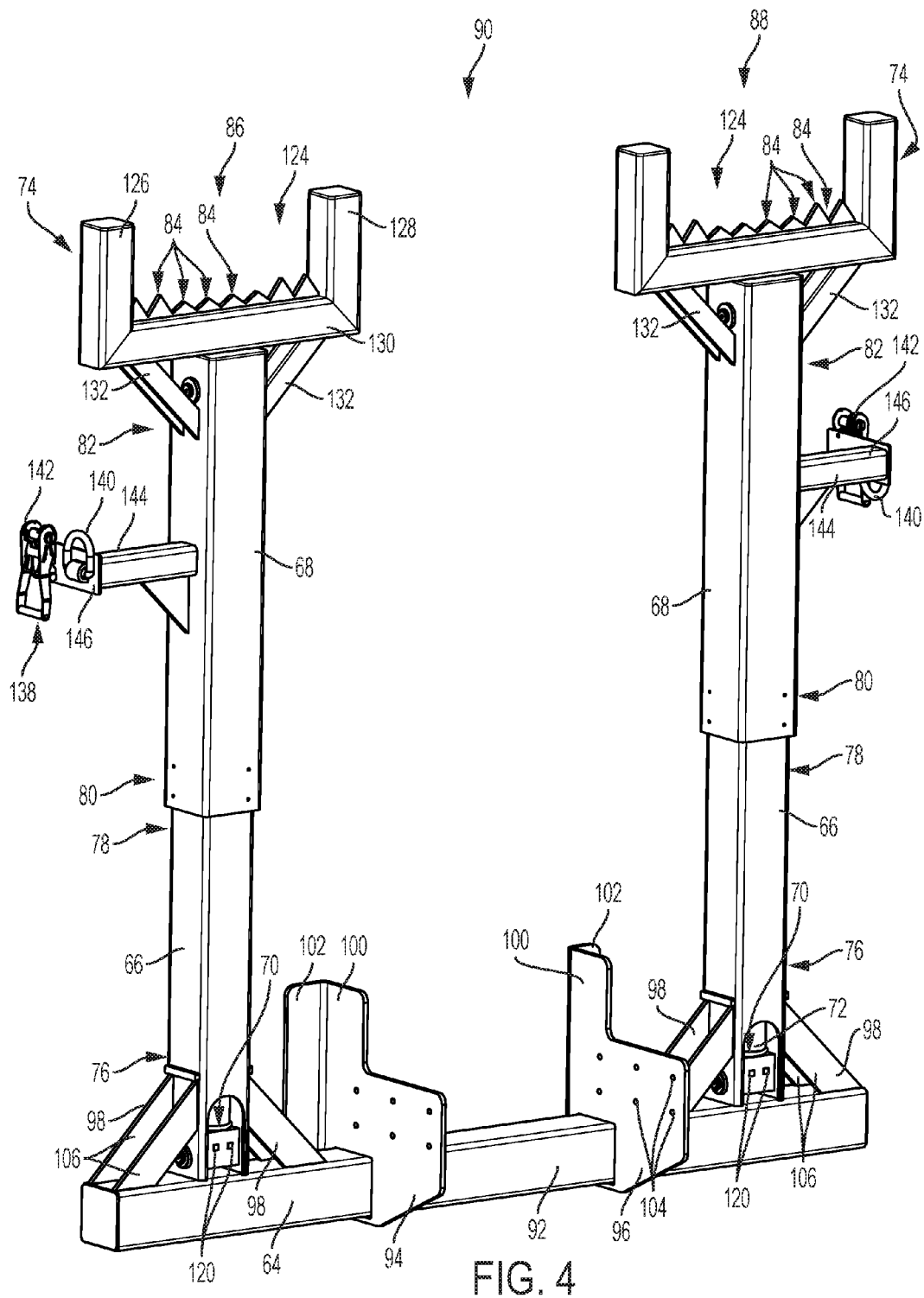
FIG. 4 is a perspective view of one embodiment of a dual telescoping pole rack assembly.

The dual telescoping pole rack assembly 90 is configured to be installed on and secured to the chassis 18 of the utility vehicle 10, such that the left-side pole rack assembly 56 and the right-side pole rack assembly 54 both include a telescoping pole rack 28. In some embodiments of the invention, the dual telescoping pole rack assembly 90 is configured to be installed on an existing utility vehicle 10. In other embodiments, the dual telescoping pole rack assembly 90 is originally manufactured with the utility vehicle 10. In some embodiments, three, four, five, or more telescoping pole racks 28 are connected to the common base In embodiments of the invention, the base 64 includes a lateral base segment 92, a first chassis-interface plate 94, a second chassis-interface plate 96, and a plurality of lower angle supports 98. The lateral base segment 92 traverses the chassis 18 laterally beneath the level of the deck 32. In embodiments of the invention, the lateral base segment 92 presents a length that is substantially the same as, or slightly shorter than, a width of the deck 32 of the chassis 18 of the utility vehicle 10. As illustrated in FIG. 4, in embodiments of the invention, the lateral base segment 92 presents a substantially square shape about a vertical cross-section. The substantial square shape provides a flat base to which the lower telescope segment 66 is secured. In other embodiments, another shape about a vertical cross-section may be presented by the lateral base segment 92, such as a rectangular shape, a downward-facing triangular shape, a downward-facing D-shape, or the like.

The first chassis-interface plate 94 and the second chassis-interface plate 96 are configured to be oriented adjacent to the chassis 18 of the utility vehicle 10. The first chassis-interface plate 94 and the second chassis-interface plate 96 therefore present a complementary shape to a portion of the chassis 18. For example, the first chassis-interface plate 94 and the second chassis-interface plate 96 may be secured to the rear outrigger system 40. It should be appreciated that the first chassis-interface plate 94 and the second chassis-interface plate 96 could be manufactured to present any of numerous shapes, depending on the local shape of the chassis 18 to which the base 64 is to be secured.

In embodiments of the invention such as illustrated in FIG. 4, the first chassis-interface plate 94 and the second chassis-interface plate 96 each present an L-shaped longitudinal vertical segment 100, a lateral vertical segment 102, a plurality of openings 104. The plurality of openings 104 are configured to receive fasteners therethrough, be welded to the chassis 18, or the like. The lateral base segment 92 traverses each L-shaped longitudinal vertical segment 100 and is secured thereto.

The lower angle supports 98 are disposed on the lateral base segment 92 to provide lateral support for the lower telescope segment 66. The lower angle supports 98 are secured to both the lower telescope segment 66 and the lateral base segment 92. The lower angle supports 98 present a general trapezoid shape when viewed from the front or the rear. In some embodiments, each lower angle support 98 comprises two angle plates 106. Each angle plate 106 is distributed longitudinally from the other.

The lower telescope segment 66 is secured to the base 64 and oriented generally upward so as to support the upper telescope segment 68 and the utility pole 30. The lower telescope segment 66 is elongated vertically, so as to present a lower telescope height. As can be seen in FIG. 4, the lower telescope segment 66 may be substantially square about a horizontal cross-section. As can also be seen, the lower telescope segment 66 is hollow so as to present a void 108 into which the hydraulic cylinder 72 (or other actuator) may be disposed. In other embodiments, the lower telescope segment 66 and the upper telescope segment 68 may act as a hydraulic cylinder (or other actuator) by receiving the hydraulic fluid (or other power source) directly therein.

Figure 3:
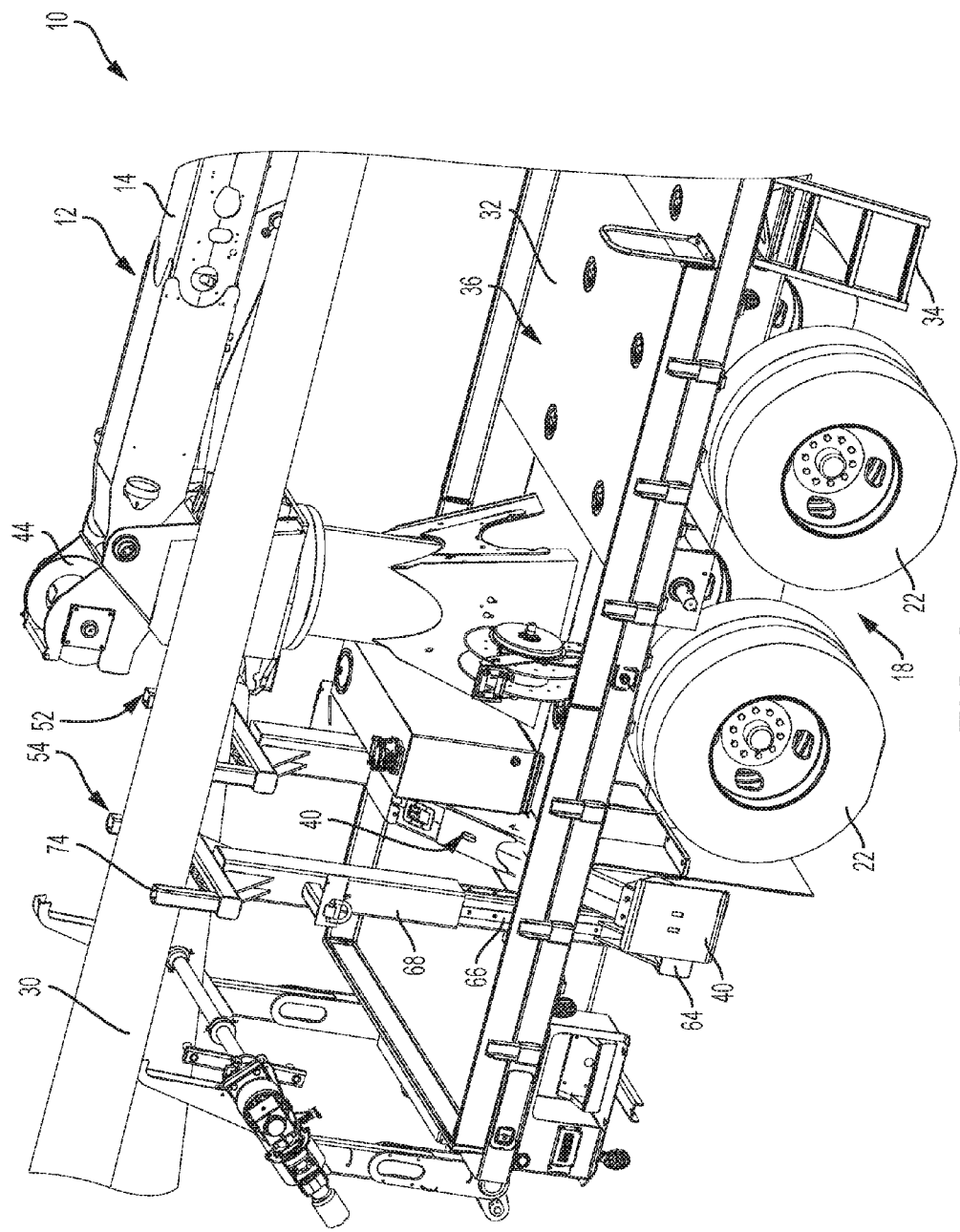
FIG. 3 is a perspective view of the utility vehicle from a right side.

The lower telescope segment 66 passes through the deck 32, as can be seen in FIG. 3. The lower telescope segment 66 therefore traverses from an under side of the deck 32 to the top working surface 36 of the deck 32. The deck 32 will therefore present an opening through which the lower telescope segment 66 is disposed. This opening may be created during an installation process for dual telescoping pole rack assemblies 90 that are added to existing utility vehicle 10s or may be originally manufactured into the deck 32.

The upper telescope segment 68 nests with the lower telescope segment 66 such that the upper telescope segment 68 can move upward and downward relative to the lower telescope segment 66, as illustrated in FIG. 4. In embodiments of the invention, such as illustrated in FIG. 4, the upper telescope segment 68 presents a larger cross-sectional area than the lower telescope segment 66. As such, the lower telescope segment 66 is disposed at least partially within the upper telescope segment 68. In other embodiments of the invention, not illustrated, the upper telescope segment 68 presents a smaller cross-sectional area that the lower telescope segment 66, such that the upper telescope segment 68 is disposed at least in part within the lower telescope segment 66.

Like the lower telescope segment 66, the upper telescope segment 68 is elongated and substantially hollow. The upper telescope segment 68 is substantially square about a horizontal cross-section. It should be appreciated that both the upper telescope segment 68 and the lower telescope segment 66 could present another shape about a horizontal cross-section, such as a circle, an ellipse, a triangle, or the like. It should be appreciated that the segment presenting the smaller diameter will have an outer shape that is complementary to the inner shape presented by the segment presenting the larger diameter. The complementary shapes allow for the respective segments to slide past one another.

Figure 5:
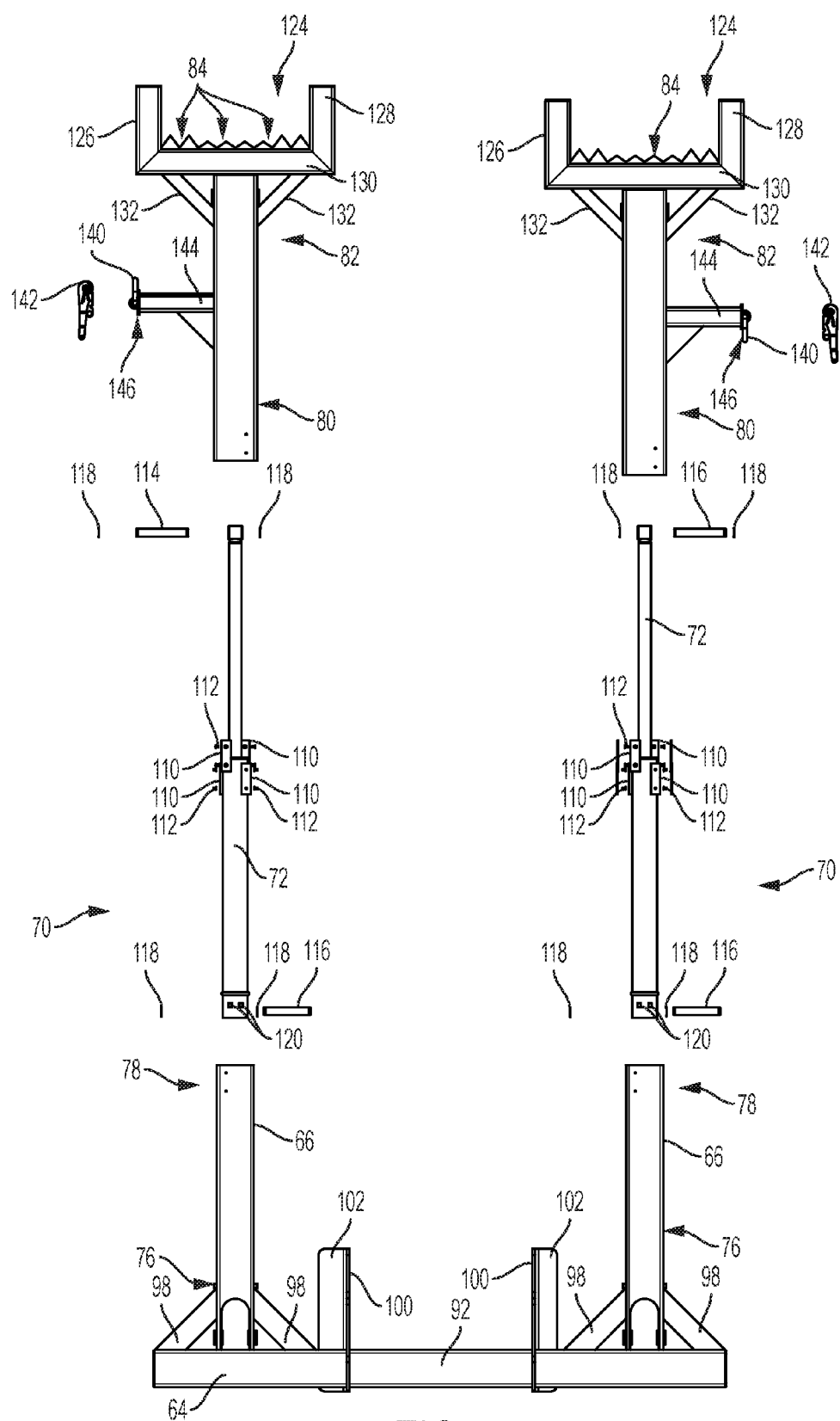
FIG. 5 is an exploded view of the dual telescoping pole rack assembly.

In embodiments of the invention, the upper telescope segment 68 and/or the lower telescope segment 66 include at least one slide pad 110, as illustrated in FIG. 5. The slide pad 110 is disposed between the upper telescope segment 68 and the lower telescope segment 66 to facilitated the sliding action of the respective segments. The slide pad 110 is secured to either the upper telescope segment 68 or the lower telescope segment 66 and oriented toward the other. In embodiments of the invention, four slide pads 110 are disposed between the upper telescope segment 68 and the lower telescope segment 66. Each of the four slide pads 110 are disposed around a corner of the upper telescope segment 68. Two opposing slide pads 110 are secured to the upper telescope segment 68 and oriented toward the lower telescope segment 66 and two opposing slide pads 110 are secured to the lower telescope segment 66 and oriented toward the upper telescope segment 68. The respective slide pads 110 may be secured via fasteners 112 or the like. The slide pads 110 may be formed of a polymer so as to facilitate smooth and easy sliding between the upper telescope segment 68 and the lower telescope segment 66.

As illustrated in FIGS. 4 and 5, the actuator 70 is disposed within the upper telescope segment 68 and the lower telescope segment 66. In embodiments of the invention, as shown in the Figures, the actuator 70 is a hydraulic cylinder 72. In other embodiments, the actuator 70 is a pneumatic cylinder. In yet other embodiments, the actuator 70 is an electric motor, a manual mechanical worm drive, or the like. The actuator 70 provides a pushing force that forces a proximal end 76 of the lower telescope segment 66 away from a distal end 82 of the upper telescope segment 68.

Figure 6:
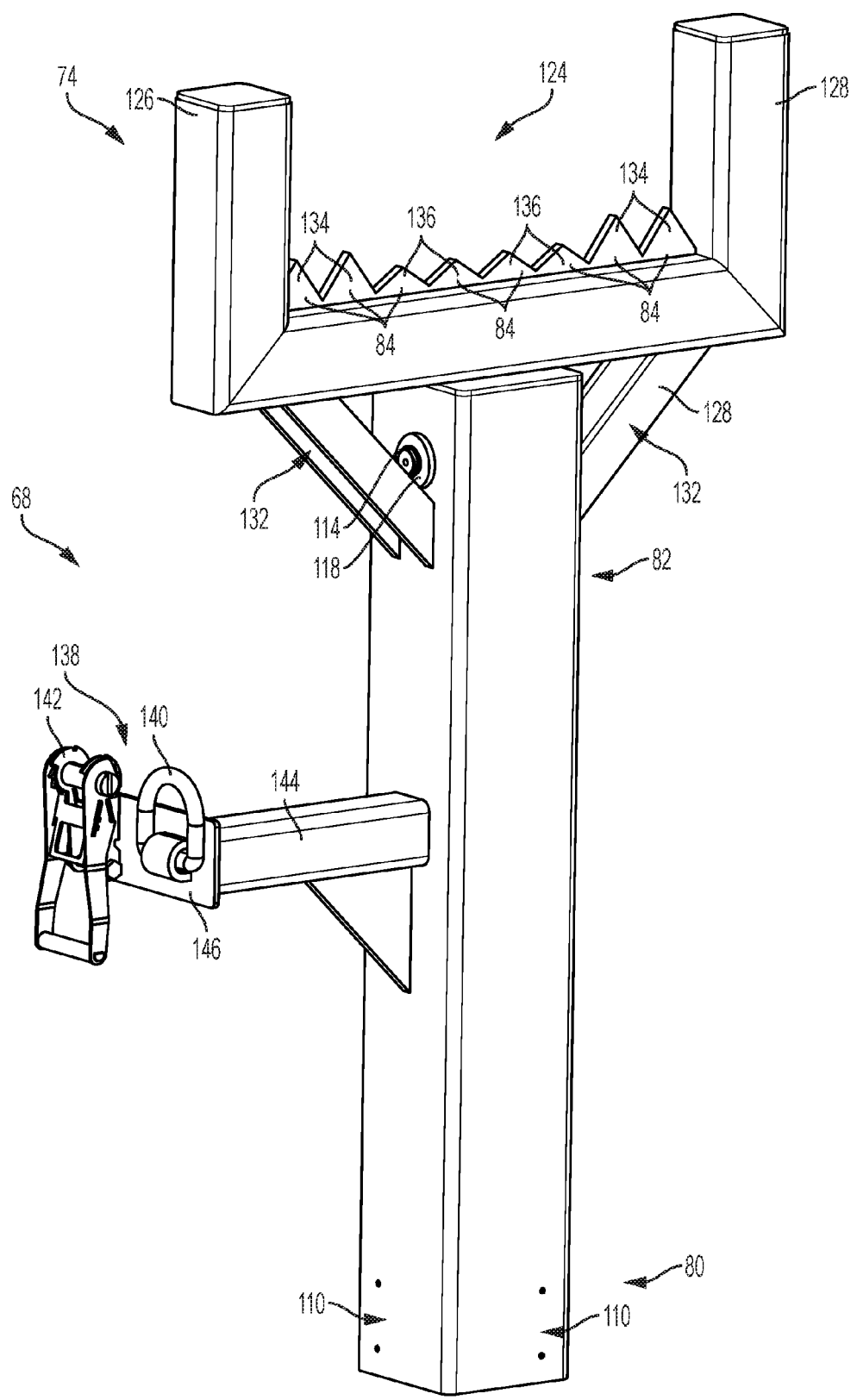
FIG. 6 is a perspective view of an upper telescope segment and U-shaped pole rest of the telescoping pole rack.

In embodiments of the invention, the actuator 70 applies this force to an upper cross-pin 116 and a lower cross-pin 118. The upper cross-pin 116 is disposed within the upper telescope segment 68 and the lower cross-pin 118 is disposed with the lower telescope segment 66. The upper cross-pin 116 may be disposed through two corresponding openings in the upper telescope segment 68. The lower cross-pin 118 may be dispose through two corresponding openings in the lower telescope segment 66. During assembly, the respective cross-pins may be slid through the respective openings so as to secure the actuator 70 in place. In other embodiments of the invention, the actuator 70 applies this force directly onto an inner surface of the upper telescope segment 68 and an inner surface of the lower telescope segment 66. The upper cross-pin 116 and the lower cross-pin 118 may further include at least one retaining ring 118 for securing the respective cross-pin in place, as illustrated in FIGS. 5 and 6. The retaining ring 118, or other fastener, is applied to the cross-pin emplaced through the two openings (and through a corresponding opening in the actuator 70).

In embodiments of the invention, the actuator 70 includes at least one fluid port 120. The fluid ports 120 allow for hydraulic fluid (or air if the actuator 70 is a pneumatic cylinder) to enter and exit the actuator 70. The lower telescope segment 66 may therefore present a channel 122 that allows for access to the fluid ports 120. The channel 122 is disposed adjacent to the ports to allow for hydraulic lines (or pneumatic lines) to be secured to the fluid ports 120.

As best illustrated in FIG. 6, the pole rest 74 is disposed atop the upper telescope segment 68 and configured to receive at least one utility pole 30 thereon. In embodiments of the invention, the pole rest 74 is generally U-shaped so as to present a recess 124 into which the utility pole 30 is placed. The pole rest 74 is configured to provide vertical support to the utility pole 30. In some embodiments, the pole rest 74 is also configured to provide lateral stability to the utility pole 30. In some embodiments, the pole rest 74 is also configured to provide longitudinal stability to the utility pole 30, such as through protrusions 84 (discussed below). The pole rest 74 may also secure the utility pole 30 to the pole rest 74 (discussed below).

In embodiments of the invention, such as illustrated in FIG. 6, the U-shape of the pole rest 74 comprises a first vertical post 126, a second vertical post 128, and a horizontal base post 130 disposed between the first vertical post 126 and the second vertical post 128. The first vertical post 126 and the second vertical post 128 are substantially parallel. In embodiments of the invention, the first vertical post 126 and the second vertical post 128 are of a substantially similar size and shape. As can be seen in FIG. 6, in embodiments of the invention, the first vertical post 126, the second vertical post 128, and the horizontal base post 130 each present a substantial square shape about a respective cross-section. In embodiments of the invention, each of the first vertical post 126, the second vertical post 128, and the horizontal base post 130 are substantially straight. In other embodiments, all or some of these members may be arcuate. In still other embodiments of the invention, not illustrated, the U-shape of the pole rest 74 comprises a continuous U-shaped post.

The horizontal base post 130 is secured to the upper telescope segment 68. Therefore, as the actuator 70 pushes the upper telescope segment 68 away from the lower telescope segment 66, the pole rest 74 is raised accordingly. This allows the operator to set the desired traveling angle once the utility pole 30 is already set upon the telescoping pole rack 28 (and the static pole rack). This is advantageous because in many instances the desired traveling angle is not readily apparent before the utility pole 30 is emplaced. For example, if the operator has recently removed the utility pole 30 but does not know the exact height, it may be difficult to tell what traveling angle will be the most appropriate in transporting that utility pole 30 back to a utility pole repository (or other disposal/repair facility). As another example, various competing safety rules and regulations may render the appropriate traveling angle difficult to estimate. The utility pole 30 may have a minimum safe clearance between the utility pole 30 and the ground, a maximum height based upon overhead obstructions on the route, a maximum forward and rearward extension based upon turns in the route, etc. By allowing the pole rest 74 of the telescoping pole rack 28 to move up and down, embodiments of the invention greatly simplify necessary calculations and repositioning of the pole rack. The operator may also slide the utility pole 30 longitudinally forward or rearward so as to meet the safety requirements. Additionally, it may be safer to emplace the utility pole 30 on the pole rack assembly 24 in a certain orientation (such as fully extended or fully retracted) and then manipulate the pole rack assembly 24 into the desired traveling angle once the utility pole 30 is safely positioned thereon.

In embodiments of the invention, the pole rest 74 includes at least one upper angle support 132. The upper angle supports 132 are secured between the horizontal base post 130 of the pole rest 74 and the upper telescope segment 68 to provide lateral stability to the pole rest 74. The upper angle supports 132 are similar to the lower angle supports 98 that are secured between the base 64 and the lower telescope segment 66. The substantially horizontal base post 130 provides a flat surface to which the upper angle supports 132 are secured.

In embodiments of the invention, the pole rest 74 comprises a plurality of protrusions 84 for inducing friction on the utility pole 30. As illustrated in FIG. 6, these protrusions 84 may be disposed on the horizontal base post 130 and oriented substantially upward so as to induce friction on the utility pole 30. The plurality of protrusions 84 is distributed laterally so as to induce friction along a circumference of the utility pole 30. As can be seen in FIG. 6, the plurality of protrusions 84 includes long protrusions 134 and short protrusions 136. The long protrusions 134 are disposed toward a left end and a right end of the horizontal base post 130. The short protrusions 136 are disposed between the left end and the right end. The combination of short protrusions 136 and long protrusions 134 cup the utility pole 30 therein and provide maximum contact between the protrusions 84 and the circumference of the utility pole 30. As illustrated in FIG. 6, eight total protrusions 84 may be utilized on the horizontal base post 130, include four short protrusions 136 disposed between two long protrusions 134 on either side. In other embodiments, more or fewer protrusions 84 may be used to achieve the desired friction with the utility pole 30.

In other embodiments, not illustrated, a second plurality of protrusions may be disposed on either or both of the first vertical post 126 and the second vertical post 128. This second plurality of protrusions are oriented inward so as to engage the utility pole 30 from a left or right direction. It should be appreciated, however, that the utility poles 30 and other loads of which the pole rack assembly 24 is configured to carry can vary greatly in diameter. As such, typically, the first vertical post 126 and the second vertical post 128 are primarily used to prevent the utility pole 30 from falling from the pole rack assembly 24. For some larger-diameter loads, the first vertical post 126 and the second vertical post 128 of the pole rest 74 may be continuously engaged with the circumference of the utility pole 30.

Typically, the protrusions 84 are formed of steel or other metal so as to provide structural strength to the protrusions 84. The protrusions 84 directly support the utility pole 30 thereon, so they must be of sufficient strength to support the load. In other embodiments of the invention, the plurality of protrusions 84 is manufactured from a polymeric material. The polymeric material reduces the damage caused to the utility pole 30 by the plurality of protrusions 84. This may be especially important for the transportation of aluminum or polymeric utility poles 30.

Figure 7:
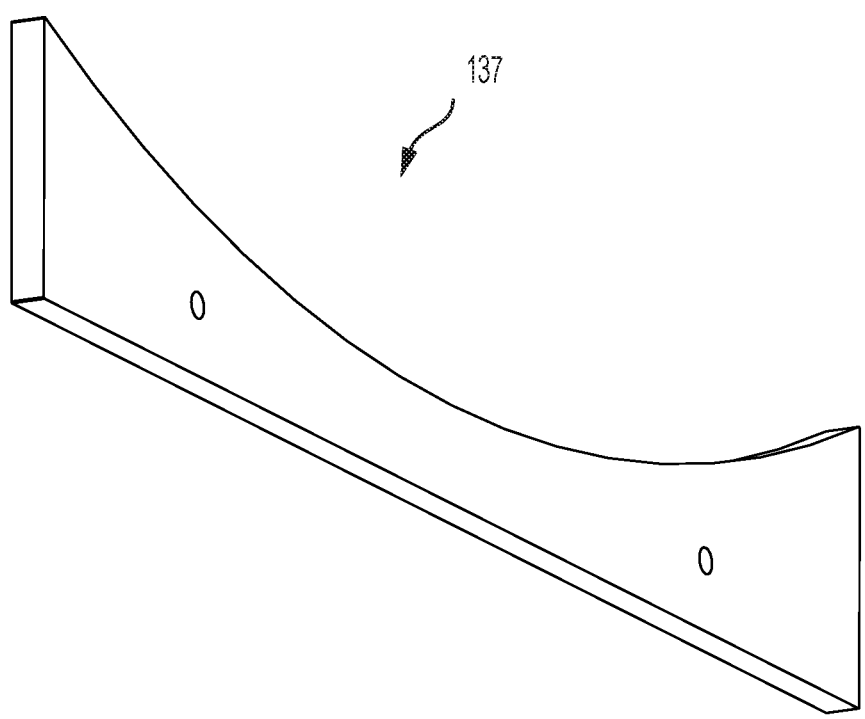
FIG. 7 is a perspective view of a protrusion guard.

In still other embodiments of the invention, illustrated in FIG. 7, a protrusion guard 137 formed of a polymeric material is utilized by the operator to prevent the metallic protrusions 84 from directly contacting the utility pole 30. This may be advantageous for utility poles 30 formed of a substance other than wood, such as a metal or a polymer. While the protrusions 84 are beneficial in retaining and securing a utility pole 30 formed of wood, the protrusions 84 can easily damage utility poles made of other substances. The protrusion guard 137 is configured to be placed into the recess 124. The protrusion guard 137 is installed alongside the plurality of protrusions 84. As can be seen in FIG. 7, the protrusion guard may present openings or other structures to allow the protrusion guard 137 to be secured to the protrusions 84 and/or the horizontal base post 130. The protrusion guard 137 may therefore be selectively added to the pole rack assembly 24 by the operator during transportation of these utility poles 30.

The polymeric material of these embodiments of the invention may possess relatively high tensile, shear, and/or compression strengths. The polymeric material of this embodiment of the invention may also possess a high impact resistance. These properties provide resistance to wear and degradation. Exemplary polymeric materials from which the protrusion guard 137 can be formed include, but are not limited to, urethane, polyurethane, polyoxymethylene, fluorinated polymers, polystyrene, plastics, thermoplastics, and thermosetting polymers. The polymeric material may also provide surface friction with the utility pole 30 so as to retain the utility pole within the pole rack assembly 24. The protrusion guard 137 also has the benefit of being inexpensive to replace if and when the protrusion guard 137 becomes damaged during use. In still other embodiments, the protrusion guard 137 is permanently installed on the pole rack assembly, such that the protrusion guard 137 is utilized to support every utility pole 130.

In embodiments of the invention, a pole-securing assembly 138 is secured to the upper telescope segment 68. The pole-securing assembly 138 is configured to strap or otherwise secure the utility pole 30 into the pole rest 74. In embodiments of the invention, pole-securing assembly 138 comprises a strap anchor 140, a strap ratchet 142, a strap post 144, and a strap base 146. The strap anchor 140 is configured to securely hold a first end of a strap and the strap ratchet 142 is configured to secure and tighten a second end of the strap that has been fed from the strap anchor 140 around the utility pole 30. The strap anchor 140 may be D-shaped or other shape so as to present an opening into which the strap may be secured. The strap ratchet 142 selectively tightens the strap, such that the operator can selectively tighten strap around the utility pole 30 until the strap securely holds it.

The strap post 144 is secured at a proximal end 80 to the upper telescope segment 68 and configured to extend laterally outward from the utility vehicle 10. The strap post 144 is configured to position the strap anchor 140 and/or strap ratchet 142 into a convenient position such that it can be accessed by the operator. The strap post 144 may also position the strap anchor 140 and the strap ratchet 142 to assist in securing the strap to the utility post. The strap base 146 secured to a distal end of the strap post 144, to provide a flat base for the securing of the strap ratchet 142 and/or strap anchor 140 thereto. The strap base 146 and strap post 144 also keep the post-securing assembly away from the immediate area around which the utility pole 30 is being maneuvered. This reduces damage to the pole-securing assembly 138.

In other embodiments, the pole-securing assembly 138 comprises the strap anchor 140 and the strap ratchet 142 without the use of the strap post or strap base. In these embodiments, the strap anchor 140 and strap ratchet 142 may be secured directly to the upper telescope segment 68, the pole rest 74, or similar structure.

In some embodiments of the invention, an additional pole-securing assembly 138 is secured to and used in conjunction with the static pole rest 26. As such, the utility pole 30 may be secured via a first pole securing assembly 138 associated with the telescoping pole rack 28 and via a second pole securing assembly 138 associated with the static pole rack 26.

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. A telescoping pole rack comprising:
   a base configured to be secured to a chassis of a utility vehicle;
   wherein the base is elongated and includes at least one interfacing plate;
   wherein the interfacing plate is complementary to the chassis of the utility vehicle;
   a lower telescope segment secured to the base and oriented in a substantially upward direction;
   an upper telescope segment configured to nest with the lower telescope segment;
   an actuator associated with the lower telescope segment and the upper telescope segment to selectively elongate the telescoping pole rack; and
   a pole rest disposed atop the upper telescope segment configured to support at least a portion of a utility pole thereon.

2. The telescoping pole rack of claim 1, wherein the telescoping pole rack is configured to be utilized in conjunction with a static pole rack, such that the utility pole is supported by both the telescoping pole rack and the static pole rack.

3. The telescoping pole rack of claim 1, wherein the base is configured to be secured to a chassis of the utility vehicle at a posterior end of the utility vehicle.

4. The telescoping pole rack of claim 1,
   wherein the upper telescope segment presents a horizontal cross-section that is larger than a corresponding horizontal cross-section presented by the lower telescope segment,
   wherein the lower telescope segment is disposed at least partially within the upper telescope segment.

5. The telescoping pole rack of claim 1,
   wherein the actuator is disposed at least partially within the upper telescope segment and the lower telescope segment,
   wherein the actuator is a hydraulic cylinder.

6. The telescoping pole rack of claim 1, wherein the upper telescope segment includes a pole-securing assembly for selectively securing the utility pole to the pole rest.

7. The telescoping pole rack of claim 6, wherein the pole-securing assembly includes:
   a strap anchor configured to securely hold a first end of a strap; and
   a strap ratchet configured to secure and tighten a second end of the strap that has been fed from the strap anchor around the utility pole.

8. The telescoping pole rack of claim 7, wherein the pole-securing assembly further includes:
   a strap post secured at a proximal end to the upper telescope segment and configured to extend laterally outward from the utility vehicle; and
   a strap base secured to a distal end of the strap post,
   wherein the strap anchor and the strap ratchet are secured to the strap base such that the pole-securing assembly is conveniently located for an operator to reach.

9. The telescoping pole rack of claim 1,
   wherein the pole rest is generally U-shaped so as to present a recess,
   wherein the recess is configured to receive the utility pole therein.

10. The telescoping pole rack of claim 9, wherein the U-shape of the pole rest includes:
    a first vertical post;
    a second vertical post; and
    a horizontal base post disposed between the first vertical post and the second vertical post.

11. The telescoping pole rack of claim 10, wherein the horizontal base post includes:
    a plurality of protrusions oriented substantially upward so as to induce friction on the utility pole,
    wherein the plurality of protrusions is distributed laterally spaced along the horizontal base post;
    wherein a first protrusion of the plurality of protrusions presents a first length and is disposed near a center of the horizontal base post,
    wherein a second protrusion of the plurality of protrusions presents a second length and is disposed near the first vertical post,
    wherein the second length is longer than the first length; and
    a protrusion guard for being selectively added to the horizontal base post,
    wherein the protrusion guard prevents the utility pole from contacting the plurality of protrusions so as to prevent damage to the utility pole.

12. The telescoping pole rack of claim 1, wherein the lower telescoping segment is secured to the base by at least one lower angle support.

13. The telescoping pole rack of claim 10, wherein the horizontal base post is secured to the upper telescoping segment by at least one upper angle support.

* * * * *